A. H. HARRINGTON.
ANTISKID FOR WHEELS.
APPLICATION FILED OCT. 23, 1916.
1,297,155.
Patented Mar. 11, 1919.
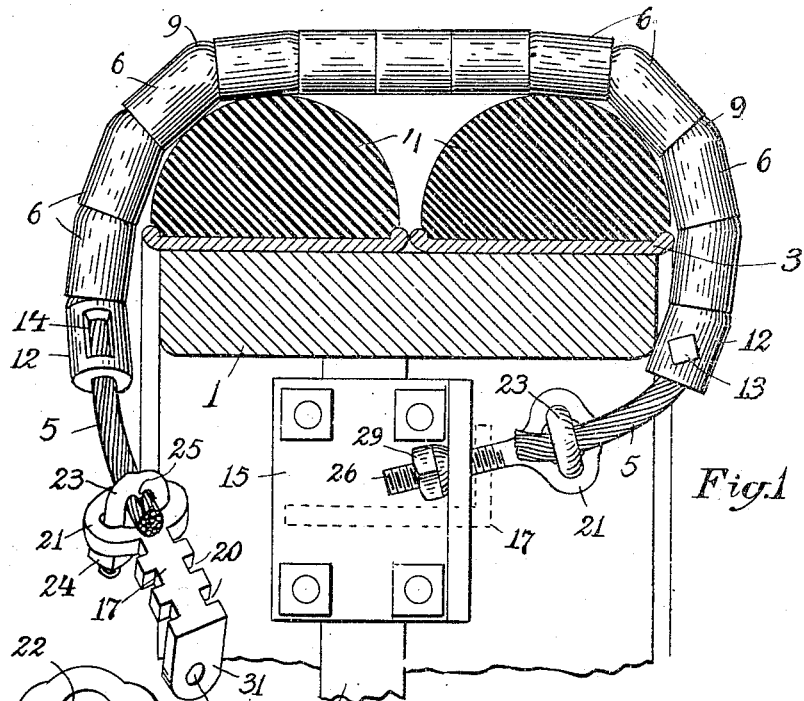
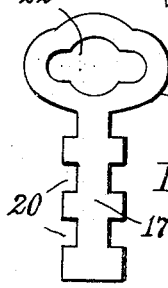
Fig. 2
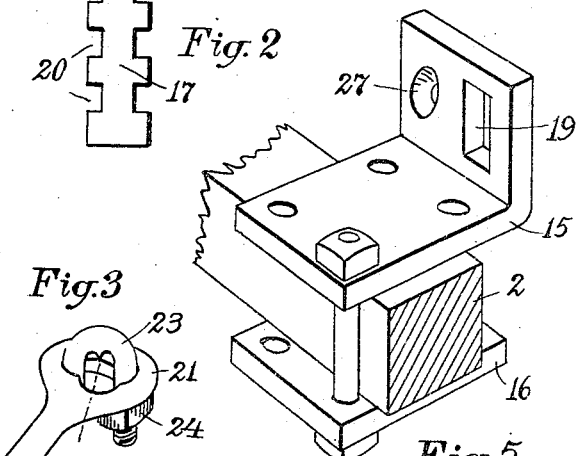
Fig. 3    Fig. 5
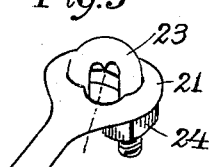
Fig. 4
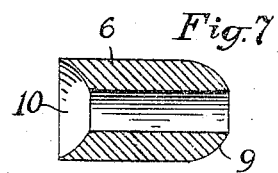
Fig. 7
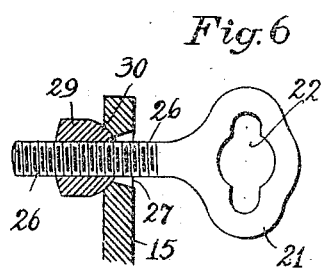
Fig. 6
Inventor,
Albert H Harrington;
By
Attorney

UNITED STATES PATENT OFFICE.

ALBERT H. HARRINGTON, OF FALL RIVER, MASSACHUSETTS, ASSIGNOR TO NON SKID COMPANY OF AMERICA, OF BOSTON, MASSACHUSETTS, A CORPORATION OF MASSACHUSETTS.

ANTISKID FOR WHEELS.

1,297,155.   Specification of Letters Patent.   Patented Mar. 11, 1919.

Application filed October 23, 1916. Serial No. 127,098.

*To all whom it may concern:*

Be it known that I, ALBERT H. HARRINGTON, a subject of the King of Great Britain, and a resident of the city of Fall River, in the county of Bristol and Commonwealth of Massachusetts, have invented certain new and useful Improvements in Antiskids for Wheels, of which the following is a full, clear, and exact specification.

This invention has for its purpose the protection of cables, ropes and chains in order to protect them both from wear and from being cut in two, while at the same time preserving the flexibility of the same. This armor is particularly designed for use on the cross members of the antiskids both on trucks and automobiles.

The armor consists essentially of comparatively short tubular members loosely mounted upon the cable, rope or chain to be shielded and rotative thereon.

In the drawings forming part of this specification, Figure 1 is a transverse section of a wheel rim and tire showing my improvements applied thereto. Fig. 2 is a face view of the key which I prefer to use for the attachment of one end of a cross member. Fig. 3 is a perspective view of a portion of the bolt for the attachment of the other end of the cross member. Fig. 4 is a perspective view of one of the armor fasteners. Fig. 5 is a perspective view of the anchor plate to which a cross member is terminally attached. Fig. 6 is a sectional view of a portion of the anchor plate showing an attaching bolt held thereby. Fig. 7 is a longitudinal section of one of the tubular elements which compose the armor of the cross members.

In Fig. 1, the reference numeral 1 designates the felly of a vehicle wheel, the one selected for illustration being of the twin-tire type; 2 is one of the spokes thereof; 3 the metal rims, and 4 the rubber tires.

I am showing but a single cross member, since all which may be used upon a wheel are substantially alike. The tensile element of this member is preferably a slender wire cable 5 having its ends suitably attached to one of the spokes 2 and passing about the tire 4 to conform generally to the face of the tire. Upon this wire cable or rope is strung a series of wear-resisting armor elements or sleeves 6, preferably composed of hardened steel. These sleeves are preferably formed as shown with male and female ends for the purpose of preventing gaps between them, especially where the cross member rounds a sharp curve, and also to enable each sleeve to partially support its immediate neighbors.

These sleeves 6 are shown more in detail in Fig. 7, where 9 indicates the convex or ball end, and 10, the concave or socket end. After a sufficient number of the sleeves have been strung upon the wire rope 5, an anchor sleeve 12 is applied at each end and fixed thereon by a set screw 13. To better insure the grip on the rope, the sleeves are each formed with a slot 14 opposite the set screw, as shown in Fig. 4. The wire rope being partially forced into such slots by the pressure of the set screws, the anchor sleeves 12 are firmly held in place.

The means which I have shown for attaching the cross members to the wheel comprise an anchor plate 15 suitably fastened to the wheel, as by means of bolts and a plate 16 by which it is clamped to one of the spokes 2, and terminal attaching devices for engaging said plate. The attaching device for one end of the wire rope consists of a key 17 thin enough to be inserted in the slot 19, and having oppositely disposed notches 20 by means of which to retain the key in the slot when turned to lie in a plane transverse to the slot.

At an end of the key is a head 21 having a transverse slot 22 therein fitted to receive a threaded staple 23. The end of the wire rope having been inserted within the staple, as shown in Fig. 1, and the nut 24 on the leg or legs of the staple forcibly turned to press the rope against the head 21, said rope end is firmly fastened in place. To render this grip even stronger, the staple is formed with a lug 25 adapted to be forced into the rope and to make the hold upon the latter absolutely certain. See Fig. 3.

The other extremity of the rope is fastened in the same manner to a bolt 26 which passes loosely through a hole 27 in the plate 15, and is held therein by a nut 29 having a convex face 30 seated in the hole 27.

I prefer to form the end of the key opposite the head 21 with an elbow 31 having a hole 32 through it. The purpose of this is to more securely lock the key in place by passing the bolt 26 through the hole 32, as indicated in dotted lines in Fig. 1.

The operation of this antiskid is as follows: The selected number of wire rope sections 5 having been made the proper length, and the armor sleeves 6 having been strung thereon and fastened in place by the anchor sleeves 12, the next step is to put each in place on the wheel: On one end of each rope section 5 is fastened a key 17, and on the other end a bolt 26, as above set forth. Each rope section is then bent around the wheel rim and tire, and the key and bolt put into engagement with the anchor plate 15. If the rope section is a trifle long, the key is made to engage its notches near the head 21, but when in place, the bolt 26 is inserted through the hole 32 of the key-elbow and the hole 27 in the plate 15. The round nosed nut 29 is finally screwed onto the bolt and turned up until the cross member is sufficiently taut to avoid rattling.

It is found that the armor sleeves, when the wheel is in use, keep up a steady but very slow rotation upon the wire rope as an axis, and consequently by their presentation of new wearing surfaces, are not abraded upon any one section more than another, but wear uniformly throughout their peripheries. The wearing surface is therefore multiplied many times over and above that of a chain or an unprotected cable, and this armored cross member will last correspondingly longer.

Further, since the wear is all taken by the armor sleeves, the cable or rope may be comparatively slender, since the only strength required thereof is sufficient to resist the strains due to tractive effects. The wire composing the cable does not require to be hardened, but may be, and actually should be, of ordinary steel which, unprotected, would wear through and be useless in a few hours.

The armor sleeves, on the other hand, since no tensile or bending strains are to be resisted thereby, can be steel hardened to the degree best adapted to withstand wear. Moreover, when some of the sleeves have worn down to an extent rendering them liable to crushing, it is only the work of a few minutes to detach one end of each cross member and renew those of the armor sleeves which are the most badly abraded, or to shift the sleeves, putting the unworn ones in the place of the worn ones, and vice versa.

Another advantage inherent in the armored cross members is due to the cylindrical and rotative features thereof, and the consequent harmlessness relative to the rubber tires. Where the well known chain cross members are used, the same are forced into the rubber and by their cutting and lacerating action soon destroy the tires.

This is especially the case with antiskid tires now so generally used, which are formed with various types of projections. Chain cross members sink in between these projections and so entirely prevent the relative travel between the same and the tire, and soon cut into the rubber and ruin the tire.

My cable being somewhat resilient transversely, it instantly springs out of any depression in the tire, and, in addition, being provided with rotatable armor sections which roll over past the projections, my cross members cannot be made to stay at any one point of the tire but freely travel along the latter.

Although I have illustrated my armored cross members as applied to solid rubber tires, and as terminally fixed, I do not at all restrict myself thereto, but use the same in connection with pneumatic tires, loosely attached.

By the expression "annular devices," I wish to designate any form of ring-shaped armor no matter what its thickness or length.

What I claim is:

1. An antiskid for wheels comprising a flexible member transversely disposed over the tire of the wheel for which it is designed, and a plurality of rotatively independent wear-resisting members loosely inclosing the flexible member.

2. An antiskid for wheels comprising a flexible member transversely disposed over the tire of the wheel for which it is designed, and a tubular wear-resisting member loosely inclosing the flexible member and rotative thereon.

3. An antiskid for wheels comprising a length of cable disposed over the tire of the wheel for which it is designed, and a plurality of rotatively independent wear-resisting members loosely mounted on the cable.

4. An antiskid for wheels comprising a cross member extending transversely over the face of the tire to the wheel to conform generally with the face of the tire, and a plurality of wear-resisting members carried by said cross member and rotatable thereon.

5. An antiskid for wheels having a cross member extending transversely over the face of the tire to the wheel to conform generally with the face of the tire and a plurality of wear-resisting members rotatably mounted upon said cross member, and means for holding said cross member.

In testimony that I claim the foregoing invention I have hereunto set my hand this 7th day of September, 1916.

ALBERT H. HARRINGTON